US007071917B2

(12) United States Patent
Kori

(10) Patent No.: US 7,071,917 B2
(45) Date of Patent: Jul. 4, 2006

(54) ELECTRONIC APPARATUS AND METHOD AND PROGRAM OF CONTROLLING THE SAME

(75) Inventor: Takayuki Kori, Kanagawa (JP)

(73) Assignee: Sony Corporatiom, Tokyo (JP)

( * ) Notice: Subject to any disclaimer, the term of this patent is extended or adjusted under 35 U.S.C. 154(b) by 242 days.

(21) Appl. No.: 10/327,941

(22) Filed: Dec. 26, 2002

(65) Prior Publication Data

US 2003/0132928 A1 Jul. 17, 2003

(30) Foreign Application Priority Data

Jan. 9, 2002 (JP) ............................. 2002-002126

(51) Int. Cl.
*G09G 5/08* (2006.01)
(52) U.S. Cl. ...................... 345/157; 713/300; 345/1.1; 345/204
(58) Field of Classification Search ................ 345/1.1, 345/103, 204, 157; 713/300, 310, 322, 323; 361/680, 681
See application file for complete search history.

(56) References Cited

U.S. PATENT DOCUMENTS

| 4,481,382 | A | * | 11/1984 | Villa-Real | ................ 455/556.1 |
|---|---|---|---|---|---|
| 5,425,077 | A | * | 6/1995 | Tsoi | ............................. 455/566 |
| 5,576,929 | A | * | 11/1996 | Uchiyama et al. | ........... 361/680 |
| 5,691,747 | A | * | 11/1997 | Amano | ........................ 345/167 |
| 5,867,140 | A | * | 2/1999 | Rader | .......................... 345/98 |
| 5,881,299 | A | * | 3/1999 | Nomura et al. | .............. 713/324 |
| 6,556,185 | B1 | * | 4/2003 | Rekimoto | .................... 345/157 |
| 6,567,785 | B1 | * | 5/2003 | Clendenon | ................... 705/11 |
| 6,731,753 | B1 | * | 5/2004 | Park et al. | ............. 379/433.07 |
| 6,822,851 | B1 | * | 11/2004 | Yukawa et al. | ............. 361/679 |
| 2003/0006968 | A1 | * | 1/2003 | Solomon | .................... 345/168 |
| 2003/0156382 | A1 | * | 8/2003 | Yukawa et al. | ............. 361/683 |

FOREIGN PATENT DOCUMENTS

| WO | WO 97/12470 | 4/1997 |
|---|---|---|
| WO | WO 200054480 A1 * | 9/2000 |

* cited by examiner

*Primary Examiner*—Amr A. Awad
*Assistant Examiner*—Tom Sheng
(74) *Attorney, Agent, or Firm*—Oblon, Spivak, McClelland, Maier & Neustadt, P.C.

(57) ABSTRACT

An electronic apparatus includes a keyboard unit fixed to the vicinity of the bottom of a display unit. The electronic apparatus also includes a detecting unit for detecting whether a portion of a display area of the display unit is covered by the keyboard unit and a display control unit for controlling a display mode for an uncovered portion, which is not covered by the keyboard unit, of the display area of the display unit while the detecting unit detects that a portion of the display area of the display unit is covered by the keyboard unit.

6 Claims, 11 Drawing Sheets

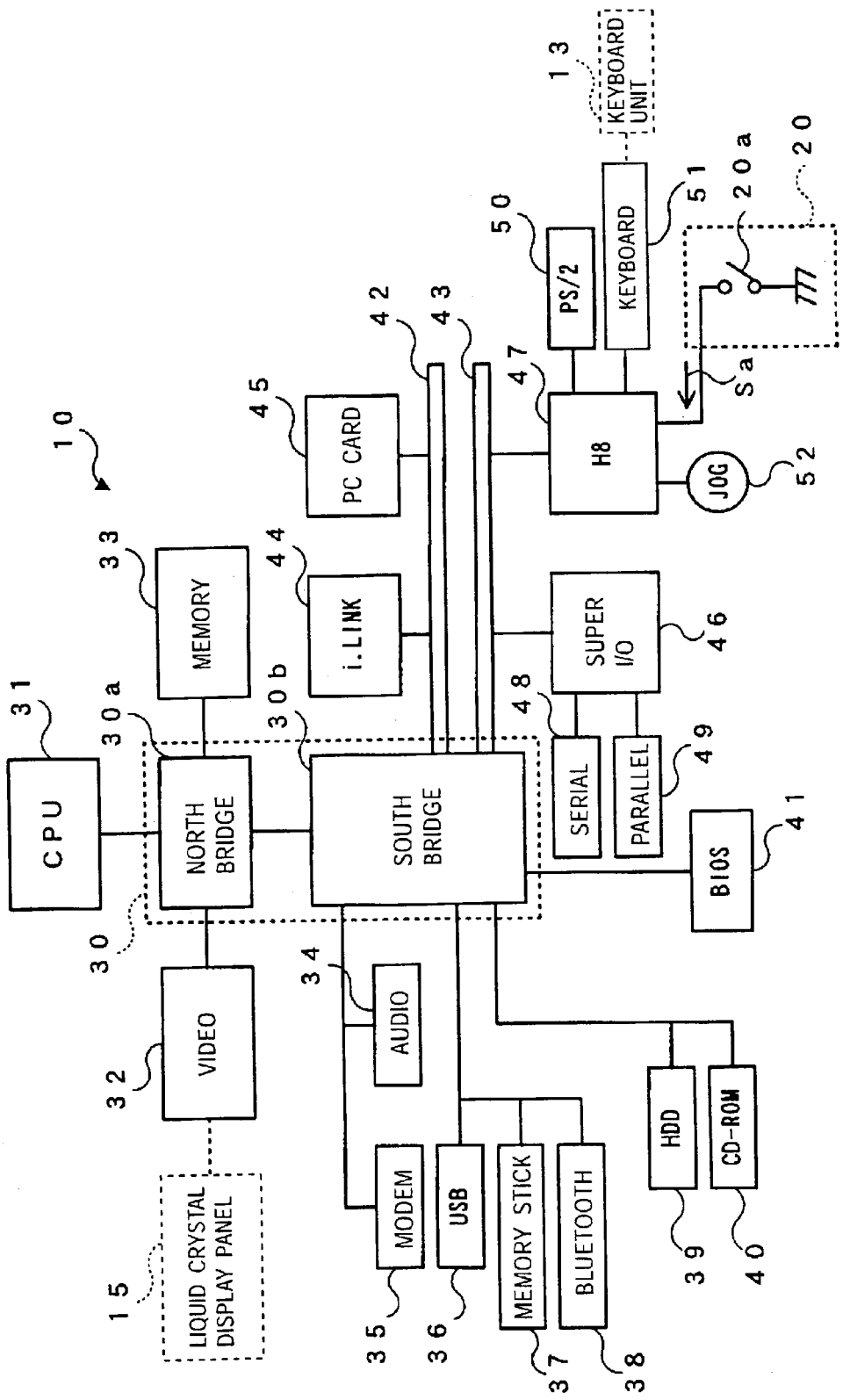

ELECTRONIC APPARATUS AND METHOD AND PROGRAM OF CONTROLLING THE SAME

BACKGROUND OF THE INVENTION

1. Field of the Invention

The present invention relates to electronic apparatuses. More particularly, the present invention relates to an electronic apparatus including a display device and a keyboard (or an input device similar to a keyboard).

2. Description of the Related Art

A typical example of an electronic apparatus provided with a keyboard or a similar input device (hereinafter, represented by a keyboard) is a personal computer. Users operate keyboards and input required commands or characters to personal computers while interacting with information displayed on display devices. Display devices function as output means for giving information to users, and keyboards function as input means for inputting information into personal computers.

Recently the display performance of personal computers has developed. For example, there are even types which have functions for playing television broadcasts and digital versatile disks (DVDs), as well as data-processing functions. Since keyboards are used less frequently as a result of these developments, the personal computers should be designed so that the keyboard can be attractively stored.

Notebook-size personal computers have integrated keyboards and display devices and can be folded. Therefore, there is no need to consider a place for storing the keyboard. Desktop personal computers of this folding type are also coming into use, and initial steps for improving keyboard storage have been taken.

According to these improvements, however, the whole display screen of the display device is covered by the keyboard. Thus, the keyboard must be removed from storage every time the user needs to look at the display on the display device. This causes inconvenience and problems because the display device cannot be used while the keyboard is folded away.

SUMMARY OF THE INVENTION

Accordingly, it is an object of the present invention to provide an electronic apparatus that can use a portion of a display screen of a display device even while the keyboard is collapsed (folded away) and that thereby simultaneously achieves both the ability to store the keyboard and availability of the display device.

An electronic apparatus includes an input device; a display unit; a fixing device for fixing the input device to the vicinity of the bottom of the display unit; a detecting unit for detecting whether a portion of a display area of the display unit is covered by the input device; and a display control unit for controlling a display mode for an uncovered portion, which is not covered by the input device, of the display area of the display unit while the detecting unit detects that a portion of the display area of the display unit is covered by the input device.

A method for controlling an electronic apparatus having an input device fixed to the vicinity of the bottom of a display unit includes a detecting step for detecting whether a portion of a display area of the display unit is covered by the input device; and a display control step for controlling a display mode for an uncovered portion, which is not covered by the input device, of the display area of the display unit while processing in the detecting step detects that a portion of the display area of the display unit is covered by the input device.

In a program for causing a computer to execute a predetermined processing function, the processing function includes a detecting step for detecting whether a portion of a display area of a display unit is covered by an input device fixed to the vicinity of the bottom of the display unit; and a display control step for controlling a display mode for an uncovered portion, which is not covered by the input device, of the display area of the display unit while processing in the detecting step detects that a portion of the display area of the display unit is covered by the input device.

When "a portion" of the display area of the display unit is covered by the input device (when the input device is in an "unused mode"), the display area of the display unit is divided into a portion covered (hidden) by the input device and another portion (a portion uncovered by the input device). Hereinafter, the former is referred to as a "covered portion", and the latter is referred to as an "uncovered portion", for convenience of explanation.

With this arrangement, when a portion of the display area of the display unit is covered by the input device, the detecting unit detects this state, and the display mode for the uncovered portion of the display unit is controlled by the display control unit.

Consequently, a portion of the display screen of the display unit (uncovered portion) can be used even while the input device is collapsed. Therefore, both the ability to store the keyboard unit and availability of the display unit can be simultaneously achieved.

According to an embodiment of the present invention, the input device may be a keyboard unit. In the display mode, a display may appear on the uncovered portion, which is not covered by the keyboard unit.

In this embodiment, by displaying something on the uncovered portion of the display unit, that portion of the display screen of the display unit (uncovered portion) can be effectively used while the keyboard unit is not used.

According to another embodiment of the present invention, the display may include at least one of the current date and the current time.

In this embodiment, a portion of the display screen of the display unit (uncovered portion) can be used for either date display or time display, or both the date and time display while the keyboard unit is not used.

According to still another embodiment of the present invention, while a predetermined application program is being executed in the electronic apparatus, the display may have a format corresponding to the application program.

In this embodiment, when it is detected that the keyboard unit is in an unused mode, if a predetermined application program is being executed, a display having a format corresponding to the application program can be displayed on the uncovered portion of the display unit. Various application programs may be used. For example, an application program in which the operation of the keyboard is not actively needed (for example, an application program for playing back content, such as animation or music) may be used. The user can grasp the operating state of the application software for playing back content and can operate the application software through the display appearing on the uncovered portion of the display unit. The application program described above may be a screen saver.

According to still another embodiment of the present invention, the input device may be a keyboard unit. In the display control step, a cursor may be located on the uncovered portion, which is not covered by the keyboard unit, while the processing in the detecting step detects that a portion of the display area of the display unit is covered by the keyboard unit.

In this embodiment, while the keyboard unit is closed, the cursor is always located on the uncovered portion of the display unit.

BRIEF DESCRIPTION OF THE DRAWINGS

FIG. 4 is a block diagram showing the structure of the inside of the personal computer;

DESCRIPTION OF THE PREFERRED EMBODIMENTS

The embodiments of the present invention, which are applied to a personal computer, will now be described with reference to the drawings. Various specified details and examples, and exemplary values, character strings, and other signs in the descriptions below are used merely for reference purposes in order to clarify the spirit and scope of the present invention. It is obvious that the spirit and scope of the present invention is not limited to the whole or part of these specified descriptions. Also, detailed descriptions of known methods, known procedures, known architectures, known circuit configurations, and the like (hereinafter, referred to as "known art") will be omitted. This omission is made for simple explanations and does not intentionally exclude all or part of this known art. Those of ordinary skill in the art should understand this known art when this application is filed. It is therefore obvious that the known art is included in the descriptions below.

Figure 1A:
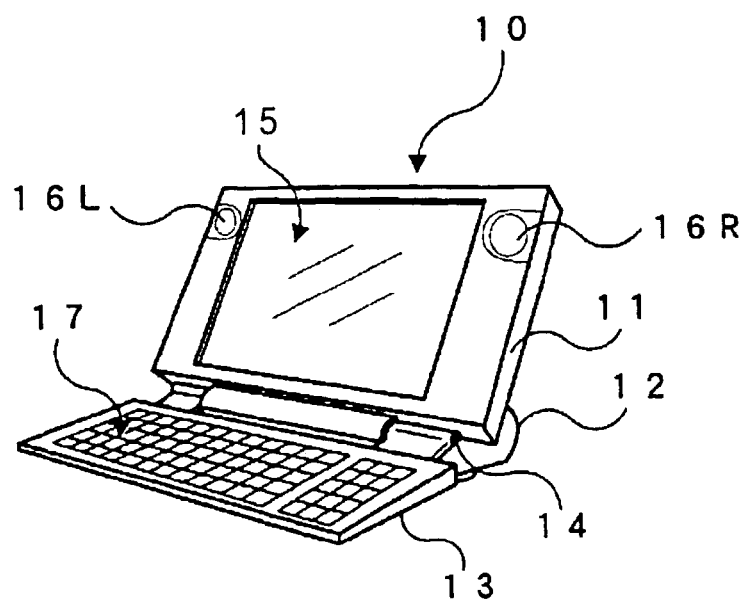
FIGS. 1A, 1B, and 1C are external perspective views of a personal computer.
Figure 1B:
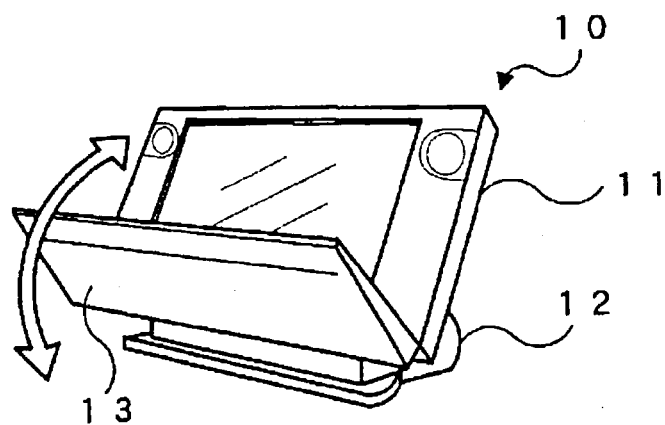
Figure 1C:
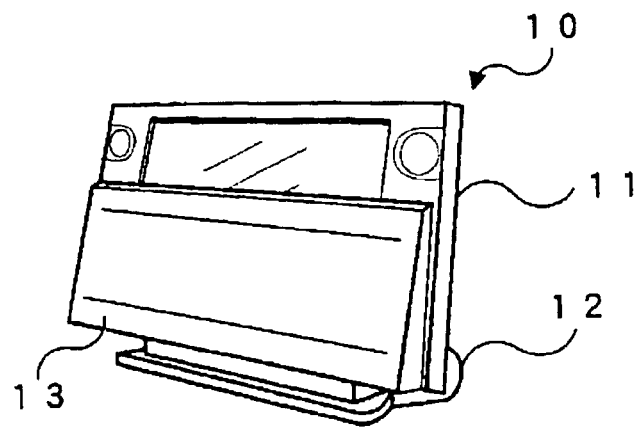

FIGS. 1A, 1B, and 1C are perspective views of the appearance of a personal computer (an electronic apparatus) 10. The personal computer 10 includes a display unit 11, a base unit 12, and a keyboard unit 13. The top of the keyboard unit 13 is movably attached to the vicinity of the bottom of the display unit 11 by a hinge mechanism 14. With this arrangement, the personal computer 10 can be in three states: an open state in which the keyboard unit 13 is opened and key operation is possible (shown in FIG. 1A), a transition state in which the keyboard unit 13 is in the transition state between the open and closed states (shown in FIG. 1B), and a closed state ("collapsed state" or "folded state") in which the keyboard unit 13 is closed and key operation is impossible (shown in FIG. 1C). The personal computer 10 can be changed from the open state to the closed state and vice versa. Accordingly, approximately the lower half of the display screen of the display unit 11 can be covered by the keyboard unit 13, when the keyboard 13 is not used.

In these drawings, the personal computer 10 includes a liquid crystal display panel (a display area) 15, and speakers 16R and 16L. The liquid crystal display panel 15 is arranged in the center front of the display unit 11. The speakers 16R and 16L are disposed on both sides of the liquid crystal display panel 15. The keyboard unit 13 includes full key tops 17 having a predetermined key arrangement, such as an arrangement conforming to Japanese Industrial Standards (JIS). The present invention is, however, not limited to the arrangement mentioned above.

The electronic apparatus according to the present invention may be of any type that has a display device and a keyboard. The electronic apparatus according to the present invention may be, for example, any type of data processing device, such as a word processor, a network terminal, and a workstation, a portable information terminal such as a personal digital assistant (PDA), a portable telephone including an automobile telephone and a personal handy-phone system (PHS) telephone, and any type of specified device used in fields such as measurement and broadcasting, such as a spectrum analyzer and a linear editing device. The above-mentioned devices, like the personal computer 10 according to this embodiment, also include a display device and a keyboard. Although some devices include other types of input device such as a numeric keypad, instead of the keyboard, such types of input device are also similar to the keyboard. Although the liquid crystal display panel 15 is used as the display device in the drawings, it is obvious that the display device in the present invention is not limited to this. The display device in the present invention may be of any other type, such as a cold-cathode tube type or an electro luminescent (EL) type.

One unique point of the electronic apparatus (personal computer 10) according to this embodiment is that approximately the lower half of the liquid crystal display panel 15 is covered when the keyboard unit 13 is in the closed state, as described above.

Figure 2A:
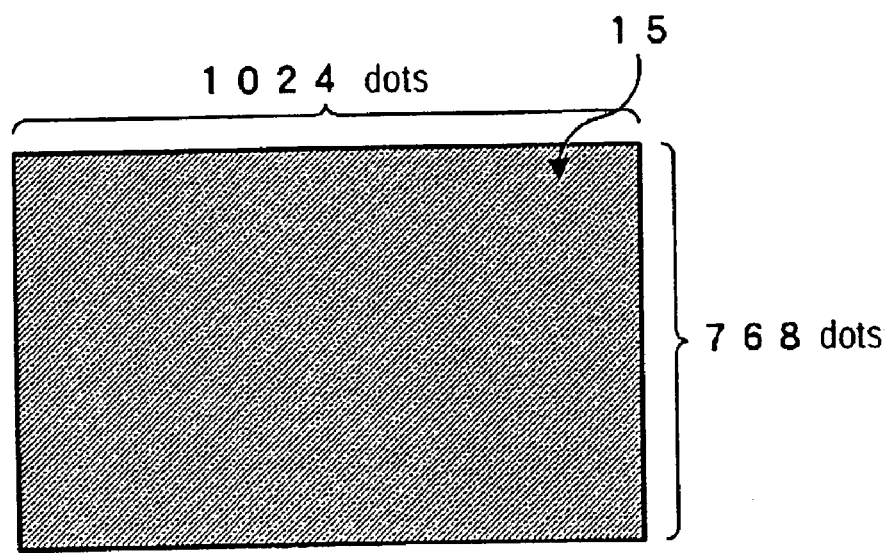
FIGS. 2A and 2B are illustrations showing a covered portion and an uncovered portion of a liquid crystal display panel when a keyboard unit is open and when the keyboard unit is closed, respectively.
Figure 2B:
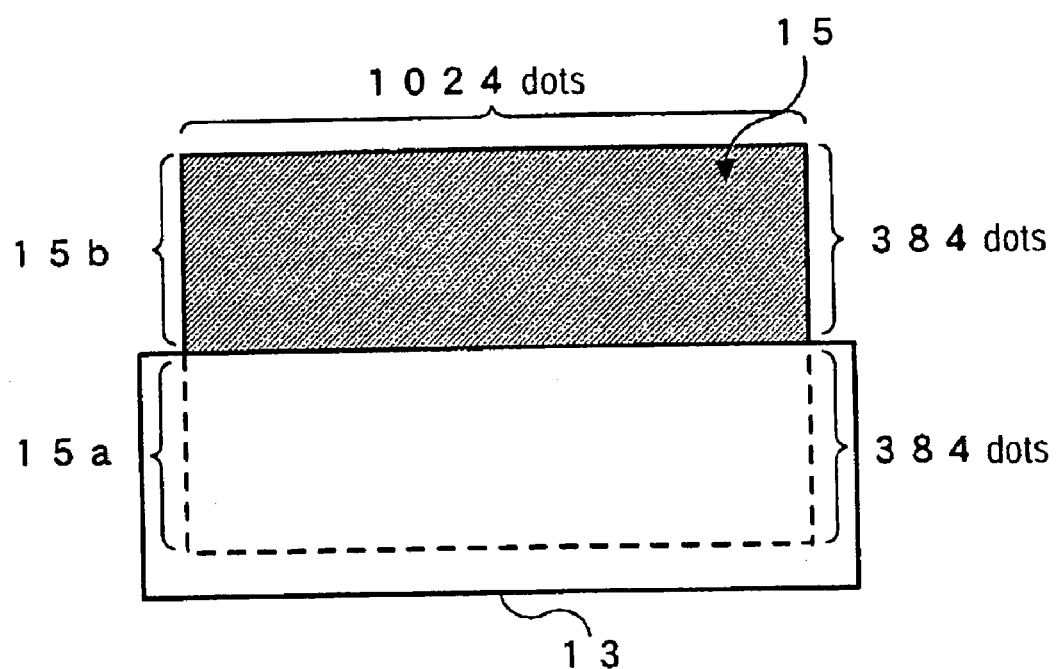

FIG. 2A schematically shows the liquid crystal display panel 15 when the keyboard unit 13 is in the open state (refer to FIG. 1A). FIG. 2B schematically shows the liquid crystal display panel 15 when the keyboard unit 13 is in the closed state (refer to FIG. 1C). In the open state, the whole display area of the liquid crystal display panel 15 is visible (exposed). In the closed state, approximately the lower half of the liquid crystal display panel 15 is covered, and only the remainder (approximately the upper half) is thus visible.

The liquid crystal display panel 15 shown in the drawings is of a landscape type which is adapted for widescreen TV broadcasts and has an extend graphics array (XGA) resolution, that is, 1024×768 dots. The covered, invisible portion (hereinafter, referred to as a "covered portion 15a"), which is the lower half of the liquid crystal display panel 15, has a resolution of 1024×384 dots when the keyboard unit 13 is in the closed state. The visible portion, which is the upper half of the liquid crystal display panel 15 (hereinafter, referred to as an "uncovered portion 15b"), has a resolution of 1024×384 dots in the closed state. It is obvious that these figures are, however, given for convenience of explanation and are not intended to limit the present invention.

Another unique point of the electronic apparatus (personal computer 10) according to this embodiment is that the personal computer 10 includes a mechanism for detecting the open/closed state of the keyboard unit 13.

Figure 3A:
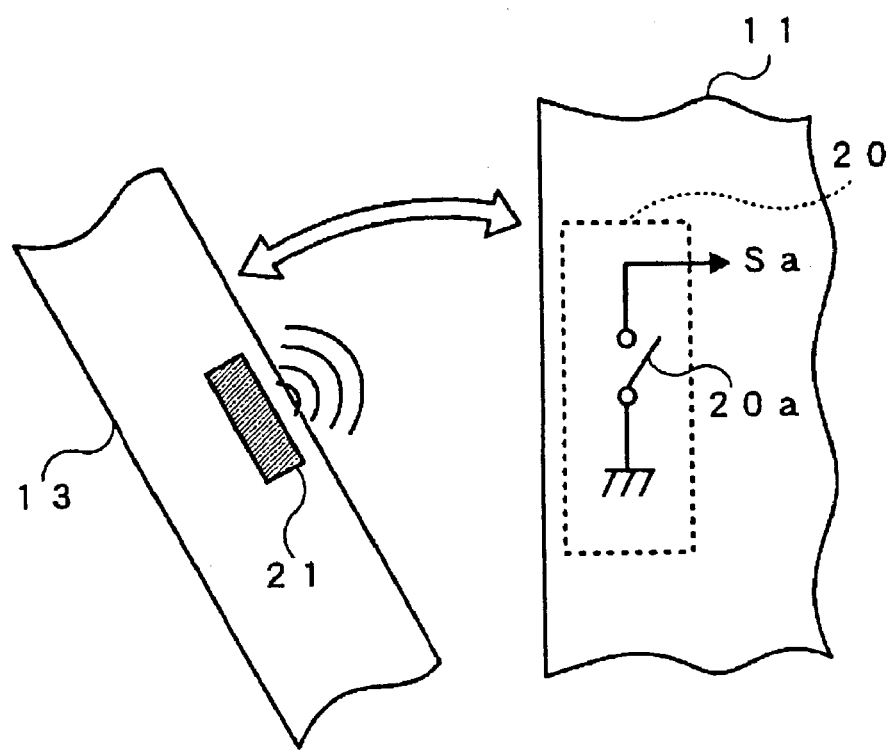
FIGS. 3A and 3B are illustrations showing a mechanism for detecting the "open/closed state" of the keyboard unit.
Figure 3B:
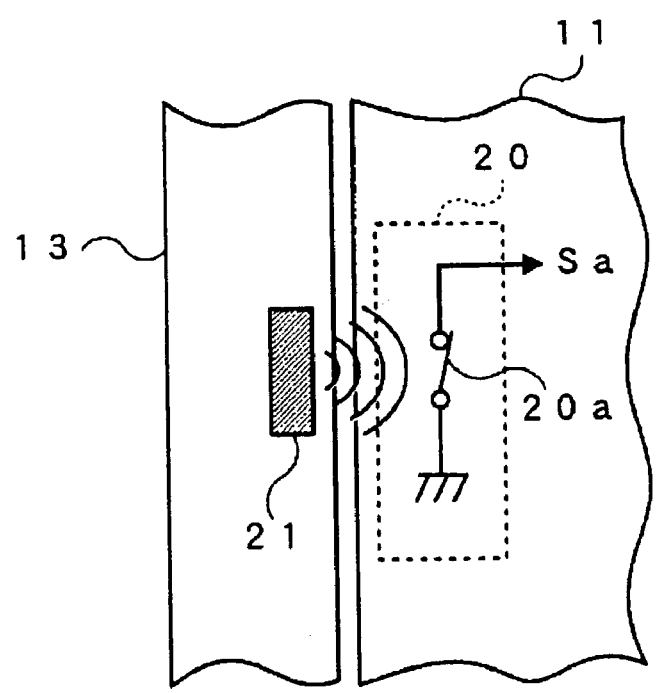

FIGS. 3A and 3B are illustrations showing an example mechanism for detecting the open/closed state. Referring to the drawings, a magnetic-induction switching element (detecting means) 20 is mounted inside the display unit 11, and a permanent magnet 21 is mounted inside the keyboard unit 13. The switching element 20 includes a "normally-off" switch contact point 20a, and the switch contact point 20a enters the "on" state by magnetic induction. The permanent magnet 21 is disposed in a suitable position magnetically influencing the switching element 20 when the keyboard unit 13 is in the closed state.

Referring to FIG. 3A, when the keyboard unit 13 is in the open state (or in the transition state), the permanent magnet 21 and the switching element 20 are separated from each other and the switch contact point 20a is thus in the "off" state. Referring to FIG. 3B, when the keyboard unit 13 is in the closed state, the permanent magnet 21 approaches the switching element 20 and the switch contact point 20a thus enters the "on" state.

For example, a ground potential (a potential corresponding to logical "0") is provided at one end of the switching element 20 and a detection signal Sa is supplied from the other end. When the keyboard unit 13 is closed, the detection signal Sa thus becomes grounded (logical "0") (refer to FIG. 3B). Accordingly, the closed state of the keyboard unit 13 can be electrically detected by the signal state becoming active (Sa=logical "0").

The structure of the inside of the electronic apparatus (personal computer 10) according to this embodiment will now be described.

FIG. 4 is a block diagram showing the structure of the inside of the electronic apparatus according to this embodiment. Although the structure shown in the diagram is not specifically limited, the structure conforms to the known AT compatible architecture. Referring to FIG. 4, in the personal computer 10, a chip set 30 including two blocks including a north bridge 30a and a south bridge 30b is connected to various chips, such as a central processing unit (CPU: display control means) 31, a video controller 32, and a memory 33. The chip set 30 is also connected to various interfaces, such as an audio controller 34, a modem 35, a universal serial bus (USB) 36, a Memory Stick (registered trademark) 37, a Bluetooth (registered trademark) device 38, a hard disk drive (HDD) 39, and a CD-R/CD-RW/DVD-R/DVD-RW drive 40, and to a basic input/output system (BIOS) chip 41. A Peripheral Component Interconnect (PCI) bus 42 and an optional Instruction Set Architecture (ISA) bus 43 extend from the south bridge 30b. The PCI bus 42 is connected to an i.Link (registered trademark) (IEEE 1394) interface 44 and a PC Card 45, and the optional ISA bus 43 is connected to a Super I/O 46, and an H8 microcomputer 47.

The Super I/O 46 controls the input and output of a serial port 48 and a parallel port 49. The H8 microcomputer 47 controls the input and output of a P/S2 (registered trademark) port 50 for a mouse or the like, a keyboard port 51, and a JOG port 52 for a game controller or the like.

The CPU 31 accesses the HDD 39 via the chip set 30 and loads a basic program (operating system), installed in the HDD 39 beforehand, into the memory 33 to execute the program.

Any application program which is executable together with the above-mentioned basic program is also installed in the HDD 39. Accordingly, the CPU 31 loads a desired application program into the memory 33 automatically or in response to a user operation, so that the application program can be executed while the above-mentioned basic program is being executed.

When using Windows (registered trademark), which is a typical example of a known general purpose operating system, as the basic program, a shortcut icon for the desired application program is saved in a particular folder called startup, so that the application program can be automatically executed. In the case of using an application program of a type executable as a background service, "startup type" in the application program is set to "automatic".

After starting up the personal computer 10, the application program designed for automatic execution, as described above, becomes resident in the memory 33 and keeps performing its functions until the personal computer 10 is shut down. Thus, such an automatic-execution application program will be, hereinafter, referred to as a "resident application program".

The CPU 31 can access various hardware resources in the personal computer 10 during the execution of the basic program and the application program, in accordance with the program content.

Like existing personal computers, in the personal computer 10 having such an arrangement, a combination of software resources, such as a basic program, an application program, or the like, and various hardware resources provides various functions, according to the program content. The personal computer 10 is different from existing personal computers in the following points.

The electronic apparatus (personal computer 10) according to this embodiment has the two above-mentioned unique points: (1) approximately the lower half of the liquid crystal display panel 15 can be covered when the keyboard unit 13 is in the closed state and (2) the personal computer 10 includes the switching element 20 for producing the detection signal Sa, which becomes active when the keyboard unit 13 is closed. Furthermore, the personal computer 10 differs from existing personal computers in the following points: (3) the detection signal Sa can be transmitted to the CPU 31 via a predetermined interface (for example, via the H8 microcomputer 47, as shown in FIG. 4); (4) the active or inactive state of the detection signal Sa can be determined by a predetermined application program by using a function of the active basic program in the CPU 31 (for example, (an application programming interface) API function); and (5) the execution state of the predetermined application program can be changed by using the determined results.

These features (1) to (5) will be specifically described below.

Figure 5:
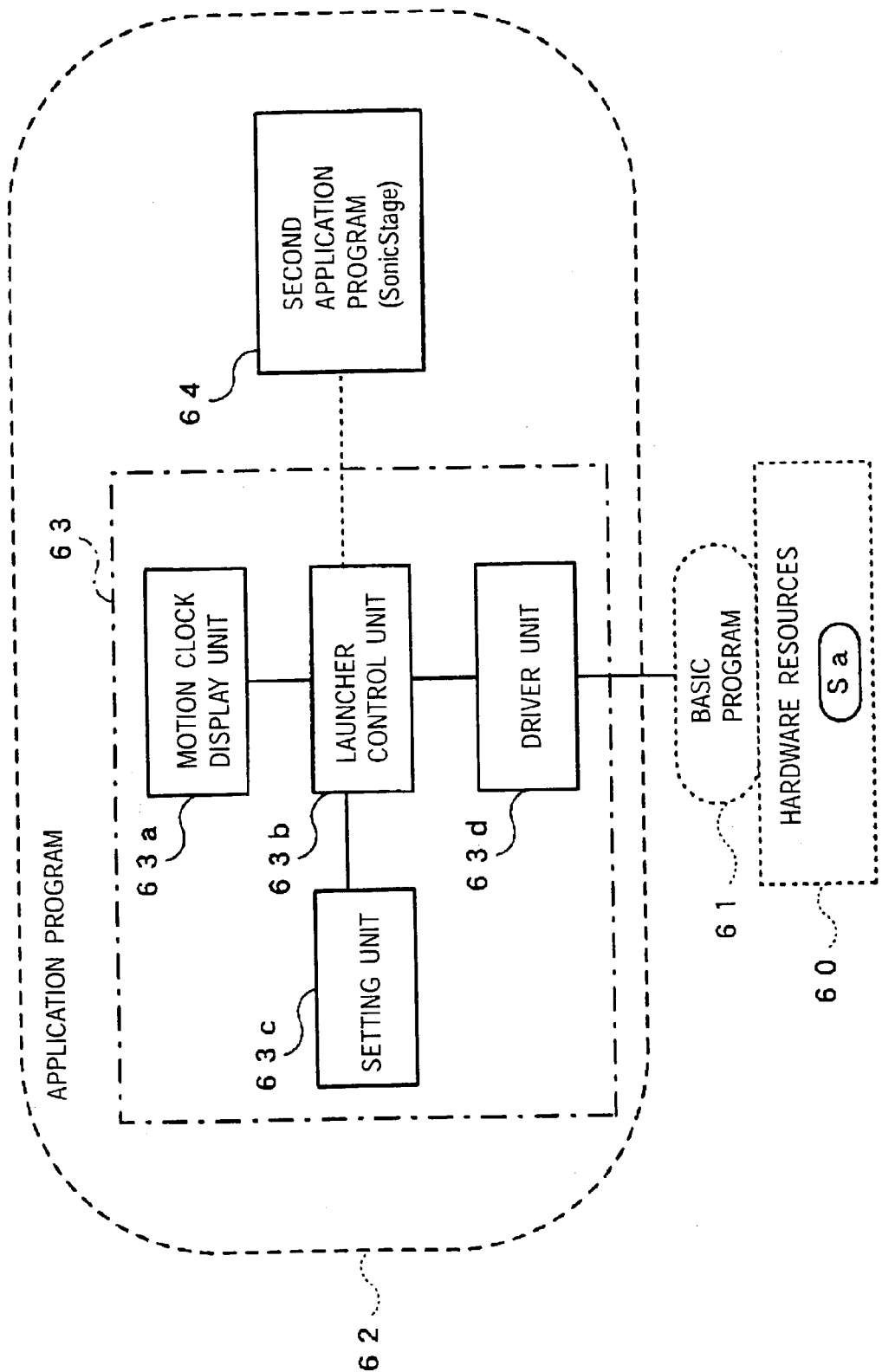
FIG. 5 is an illustration for schematically explaining features of the present invention.

FIG. 5 is an illustration schematically explaining the features of the present invention. A configuration including hardware resources 60 in the lower layer, a basic program 61 in the intermediate layer, and an application program 62 in the upper layer is shown in the drawing. The hardware resources 60 include each block shown in FIG. 4. In FIG. 5, the hardware resources 60 are simplified and only the detection signal Sa produced by the switching element 20 is shown. The basic program 61 monitors the state of the detection signal Sa. Also, if the application program 62 requires the basic program 61 to report the state of the detection signal Sa using a predetermined API function (for example, a device control function), the basic program 61 reports the state of the detection signal Sa to the application program 62 by using a value returned from the API function.

For example, when the detection signal Sa is active (the keyboard unit 13 is closed), a value returned from the, device control function indicates "true", and when the detection signal Sa is inactive (the keyboard unit 13 is open), the value returned from the device control function indicates "false". Accordingly, the evaluation of an expression "device control( )=true" by the application program 62 can determine that the keyboard unit 13 is closed.

Referring to the drawing, the application program 62 includes two independent programs: a first application program 63 and a second application program (a predetermined application program) 64. The first application program 63 is a "resident application program" which determines the open/closed state of the keyboard unit 13 by using the device control function. The first application program 63 can also change the display mode of the liquid crystal display panel 15 in accordance with the determined results. The second application program 64 is any application program that can change its own execution state under the control of the first application program 63. The relationship between the first application program 63 and the second application program 64 will be described below.

As described above, the first application program 63 can determine the open/closed state of the keyboard unit 13 and can change the display mode of the liquid crystal display panel 15 in accordance with the determined results. Here, the expression "changing the display mode" is broadly defined as giving different visual effects in the open state and closed state of the keyboard unit 13. For example, during the period determined to be the open state, a normal display (for example, Windows (registered trademark) desktop display) is displayed on the liquid crystal display panel 15. During the period determined to be the closed state, "any display" which is in response to the closed state is displayed on the liquid crystal display panel 15.

Although the "any display" may be a display that simply shows a logo image, it is desirable, for the users' convenience, that the display provide some useful information. For example, the display may be a calendar display or time display. The display will be, hereinafter, described as a display capable of displaying time (referred to as a time display).

Referring to FIG. 5, the first application program 63 includes, for example, four blocks. A first block is a motion clock display unit 63a, and a second block is a launcher control unit 63b. A third block is a setting unit 63c, and a fourth block is a driver unit 63d. Although the first application program 63 includes four blocks in this embodiment, these four blocks may be integrated into one block. The first application program 63 may also be divided into a plurality of blocks other than four blocks. In any case, the first application program 63 should be designed so that the program can be easily developed and parts of the program can be shared.

The launcher control unit 63b is a resident processing unit which is automatically executed (as a startup or a service) by being loaded into the memory 33 when the personal computer 10 is started up. The launcher control unit 63b regularly queries the basic program 61 whether the detection signal Sa is active or inactive via the driver unit 63d during execution of the program. Then, the launcher control unit 63b determines whether to launch or terminate the motion clock display unit 63a on the basis of the results.

The motion clock display unit 63a displays (opens) a predetermined display (time display) on the liquid crystal display panel 15 when a launcher command is output from the launcher control unit 63b, and closes the display (time display) when a termination command is output from the launcher control unit 63b.

The setting unit 63c has an interface display (not shown). The setting unit 63c sets the operation of the first application program 63 by using this interface display. The setting unit 63c determines whether or not to enable the motion clock display unit 63a (whether or not to allow a predetermined display to be opened) and whether or not to inhibit a screen saver when the motion clock display unit 63a is enabled and a predetermined display is thus opened.

Figure 6A:
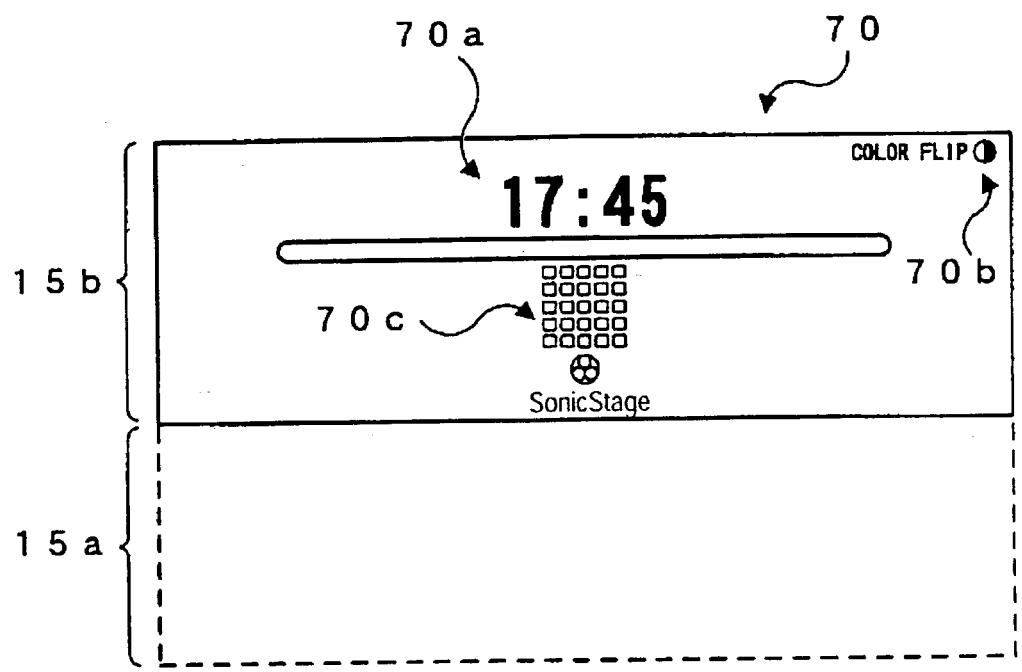
FIGS. 6A and 6B are diagrams showing layouts of time displays.
Figure 6B:
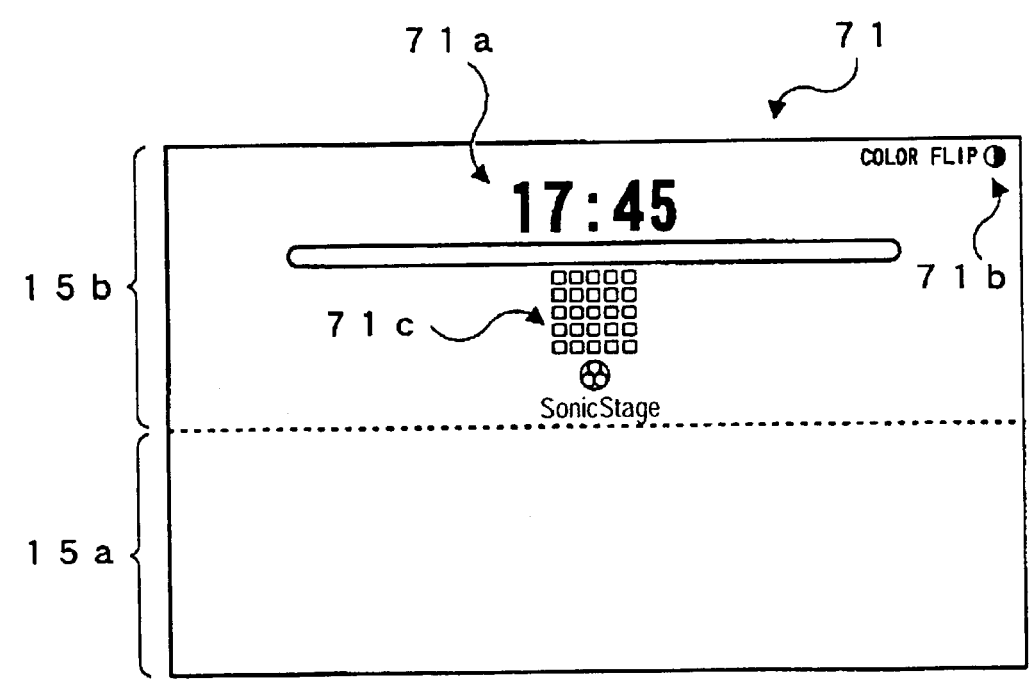

FIGS. 6A and 6B show layouts of two predetermined displays (time displays) mentioned above. The size of a time display 70 shown in FIG. 6A corresponds to that of the uncovered portion 15b of the liquid crystal display panel 15, which is 1024×384 dots. In contrast, the size of another time display 71 shown in FIG. 6B corresponds to the sum of the sizes of the covered portion 15a and the uncovered portion 15b of the liquid crystal display panel 15, that is to say, the size of the whole liquid crystal display panel 15, which is 1024×768 dots.

In both of these layouts, time display objects 70a and 71a, other operational objects such as operational objects for changing between monochrome/color display 70b and 71b, and any accessory object such as suitably designed animation objects 70c and 71c are all included in the uncovered portion 15b. Both layouts can, therefore, be adopted without substantial problems. It is, however, desirable that the mode for the time displays 70 and 71 be set to full screen display, so that the title bar and a window frame are hidden and the desktop display is hidden in order to bring the time displays 70 and 71 to the foreground. Hereinafter, descriptions will be made using the time display 70 shown in FIG. 6A for the sake of simplicity.

Figure 7:
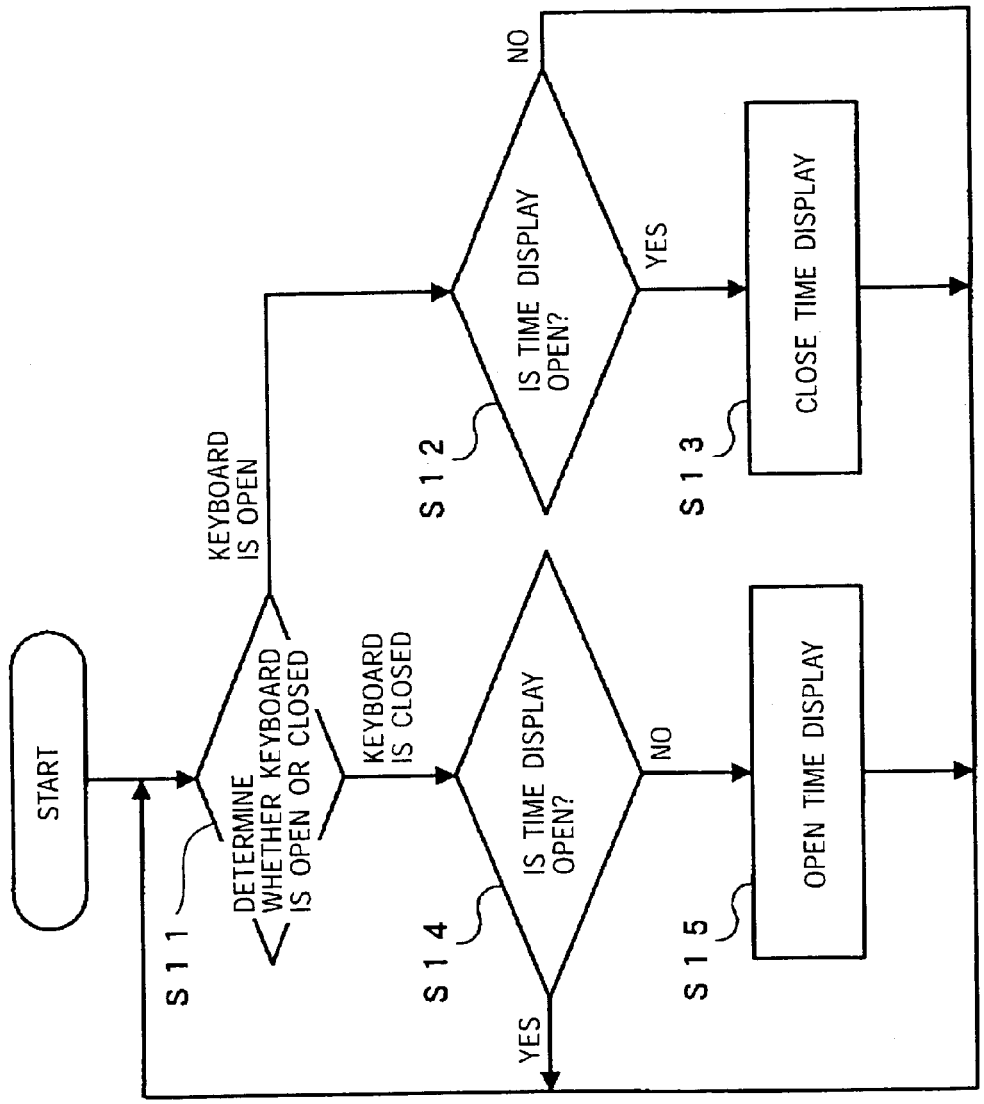
FIG. 7 is a flowchart schematically showing the processing performed by a launcher control unit.

FIG. 7 is a flowchart schematically showing the processing performed by the launcher control unit 63b. Referring to FIG. 7, the launcher control unit 63b, which is in the resident state, evaluates the expression "device control( )=true" at predetermined time intervals, and determines whether the keyboard unit 13 is open or closed (step S11). If the evaluated result is "keyboard unit is open", the launcher control unit 63b determines whether or not the time display 70 is open at that time (step S12). If the time display 70 is not opened, the launcher control unit 63b returns to the step for determining whether the keyboard unit 13 is open or closed (step S11). If the time display 70 is open, the launcher control unit 63b closes the time display 70 (step S13), and then the launcher control unit 63b returns to the step for determining whether the keyboard unit 13 is open or closed (step S11).

Figure 8A:
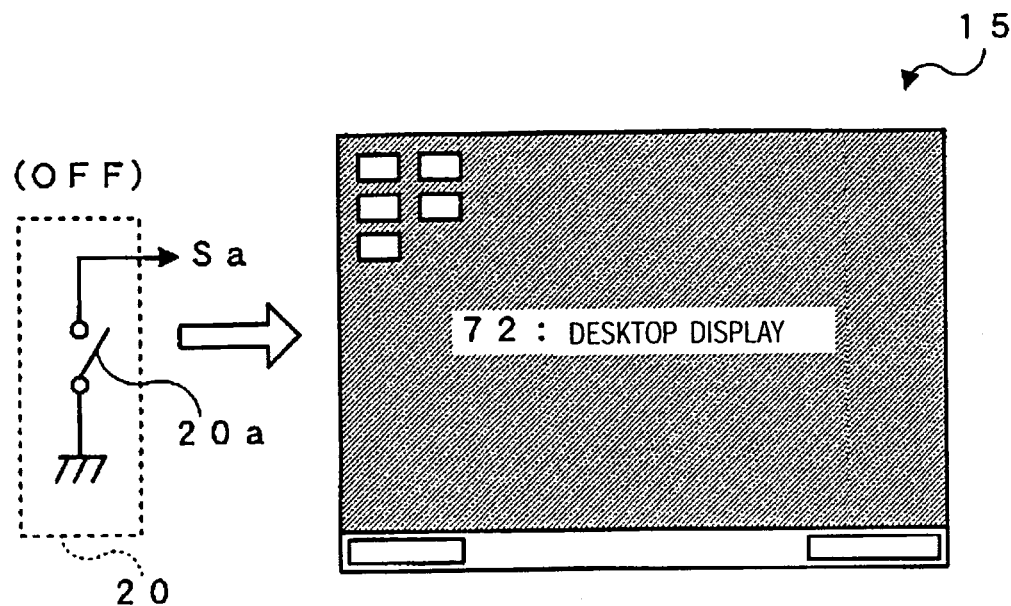
FIGS. 8A and 8B are illustrations showing display modes for the liquid crystal display panel when the keyboard unit is open and when the keyboard unit is closed, respectively.

FIG. 8A is an illustration showing a display mode for the liquid crystal display panel 15 when the keyboard unit 13 is in the open state. When the keyboard unit 13 is open, the switch contact point 20a of the switching element 20 is in the "off state", and the detection signal Sa is inactive. In this case, therefore, the time display 70 is not displayed on the liquid crystal display panel 15, and the normal display (a desktop display 72) is displayed.

Figure 8B:
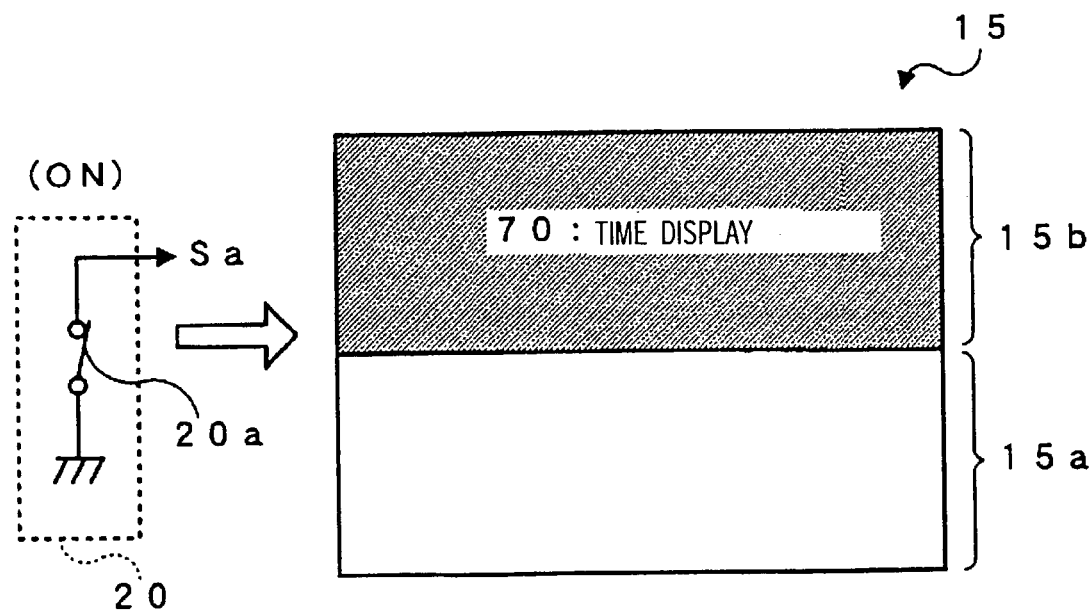

In contrast, as shown in FIG. 8B, when the keyboard unit 13 is closed, the switch contact point 20a of the switching element 20 is turned on, and the detection signal Sa thus becomes active. This signal change is detected by using the result (true) from evaluating the expression "device control( )=true" in step S11. In this case, the launcher control unit 63b determines whether or not the time display 70 is open at that time (step S14). If the time display 70 is not opened, the launcher control unit 63b opens the time display 70 (step S15). Then, the launcher control unit 63b returns to the step for determining whether the keyboard unit 13 is open or closed (step S11). If the time display 70 is open, the launcher control unit 63b returns to the step for determining whether the keyboard unit 13 is open or closed (step S11).

Accordingly, in the electronic apparatus (personal computer 10) according to this embodiment, the lower half of the liquid crystal display panel 15 can be covered by the keyboard unit 13 and the display specified for the closed state (time display 70) can be displayed on the uncovered portion 15b when the keyboard unit 13 is collapsed ("closed"). Consequently, a particular benefit in that the personal computer 10 can be utilized as a display device which offers predetermined information, such as the current time, even if the keyboard unit 13 is collapsed ("closed"). Therefore, the electronic apparatus (personal computer 10) according to this embodiment is different from personal computers of other types in which are designed simply for storing the keyboard unit, thus ensuring advantages for the electronic apparatus (personal computer 10) according to this embodiment in the market.

As described above, the display specified for "time display" in the closed state (time display 70 or 71) is displayed on the uncovered portion 15b of the liquid crystal display panel 15. The spirit and scope of the present invention is, however, not limited to this. Modifications for this embodiment will be described below.

Figure 9:
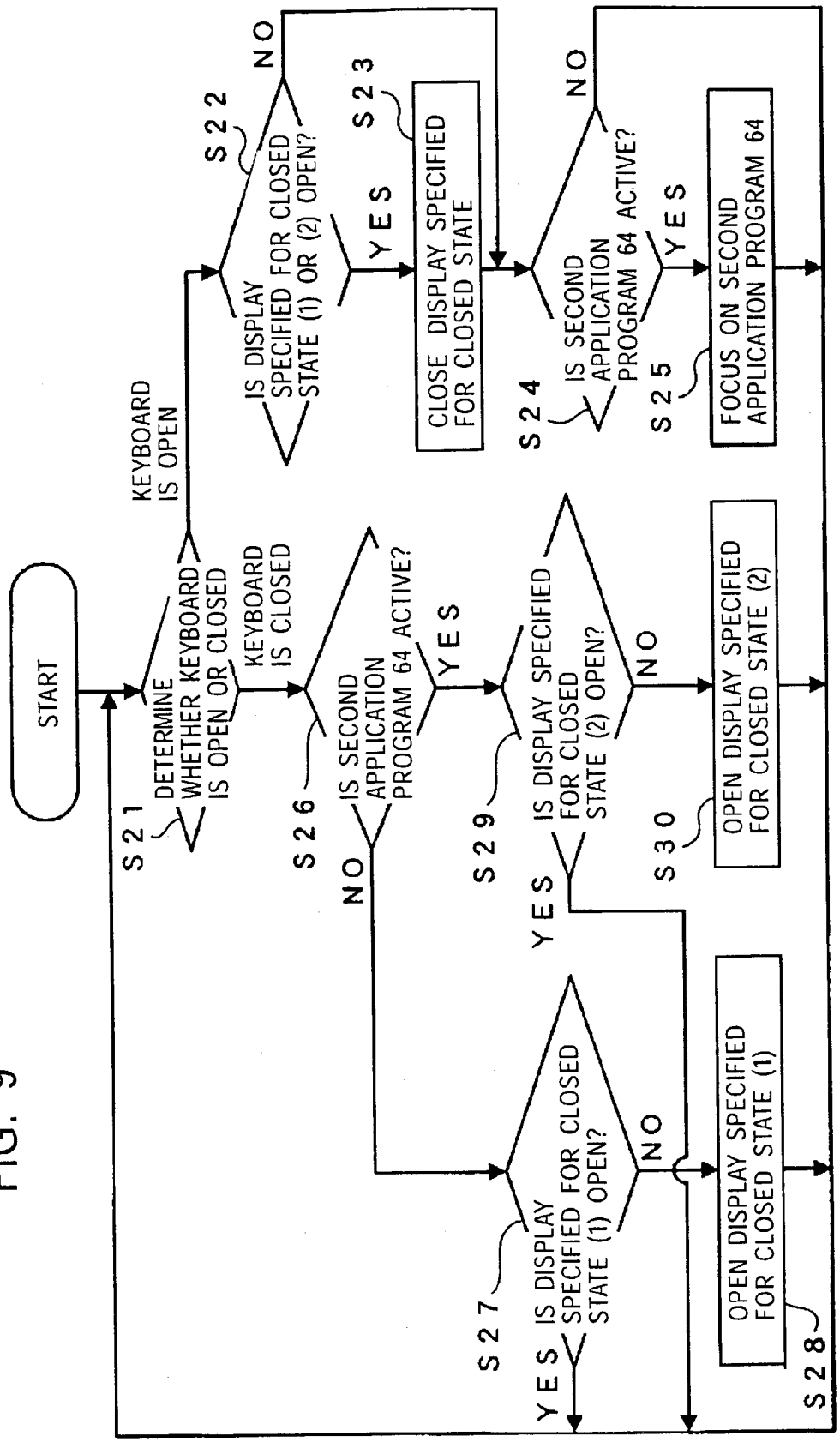
FIG. 9 is a modification of the flowchart in FIG. 7.

FIG. 9 shows a modification of the flowchart schematically showing the processing performed by the launcher control unit 63b described above (refer to FIG. 7). According to this modification, the launcher control unit 63b determines whether or not the second application program 64 (refer to FIG. 5) is being executed. In response to the results, the launcher control unit 63b switches between two displays specified for the closed state: (1) the time display 70 or 71 described above and (2) a display for time and audio control 90 or 91 (refer to FIG. 11). The second application program 64 may be, for example, an audio control program.

Figure 10A:
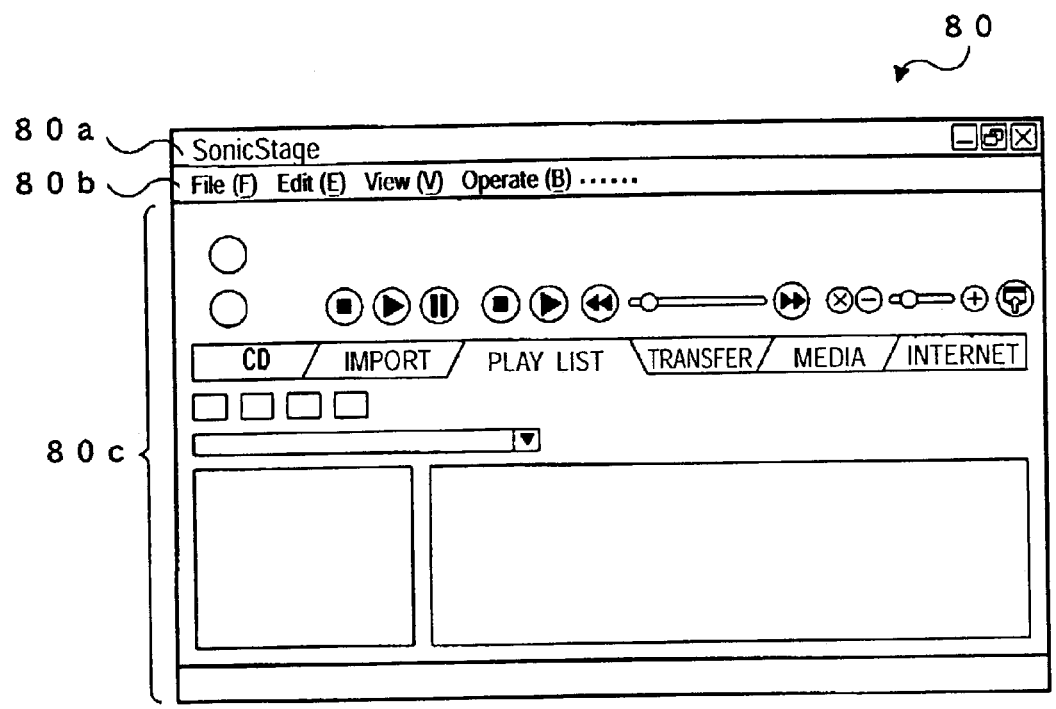
FIGS. 10A and 10B are illustrations showing examples of screen layouts of a second application program.
Figure 10B:
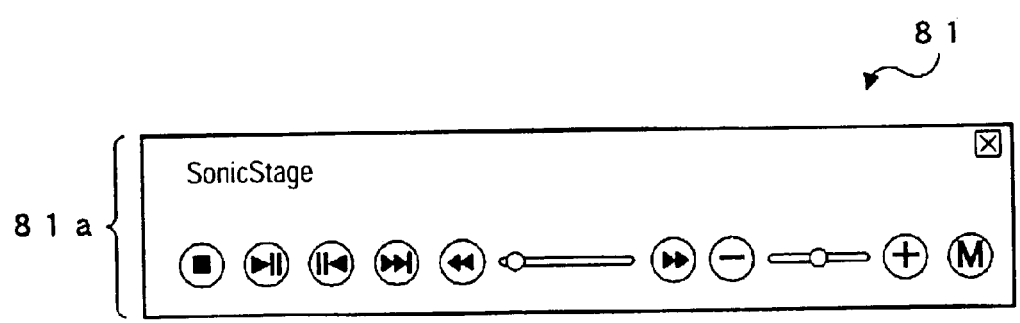

FIGS. 10A and 10B show examples of the screen layouts of the audio control program (hereinafter, referred to as "SonicStage" (registered trademark)). This SonicStage display has two display modes: a detailed display 80 and a simple display 81. The detailed display 80 includes a title bar 80a, a menu bar 80b, and a client area 80c. Various controls for manipulating audio resources are disposed in the client area 80c. For example, the client area 80c is arranged with control buttons, such as a stop button, a play button, a pause button, a volume control, a fast-forward button, a fast-rewind button, and a display having a file list, such as "CD", "import", "play list", "transfer", "media", and "internet", which are managed by SonicStage. In contrast, the simple display 81 has only a client area 81a on which required minimum controls are disposed. For example, the client area 81a is arranged with control buttons, such as a stop button, a play button, a pause button, a volume control, a fast-forward button, and a fast-rewind button. The user can freely switch between the detailed display 80 and the simple display 81.

Figure 11A:
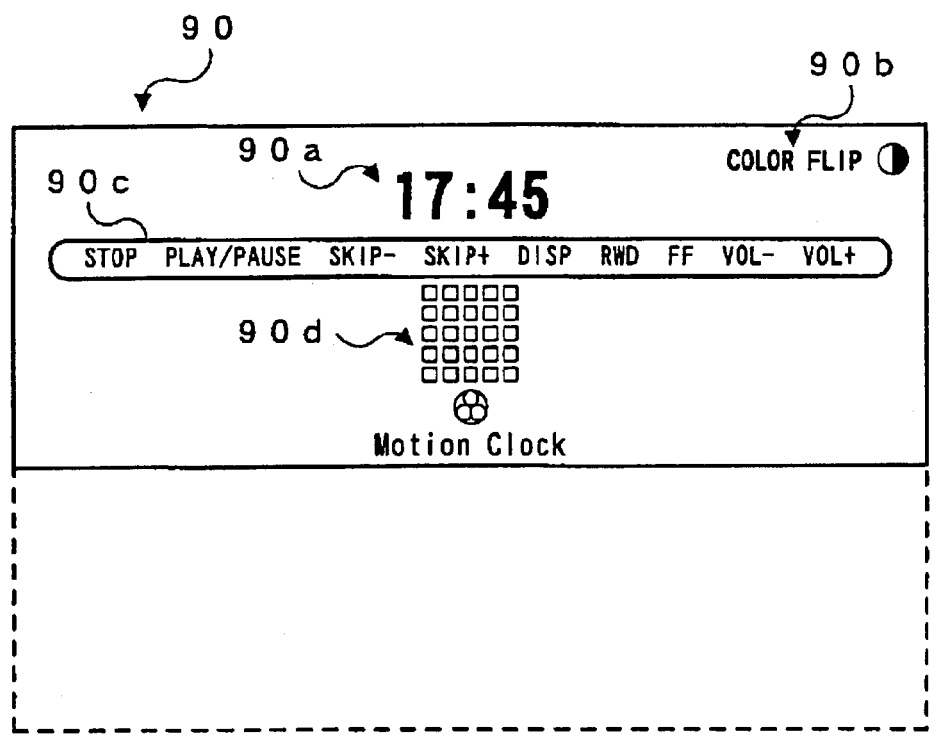
FIGS. 11A and 11B are illustrations showing layouts of a display for time and audio control.
Figure 11B:
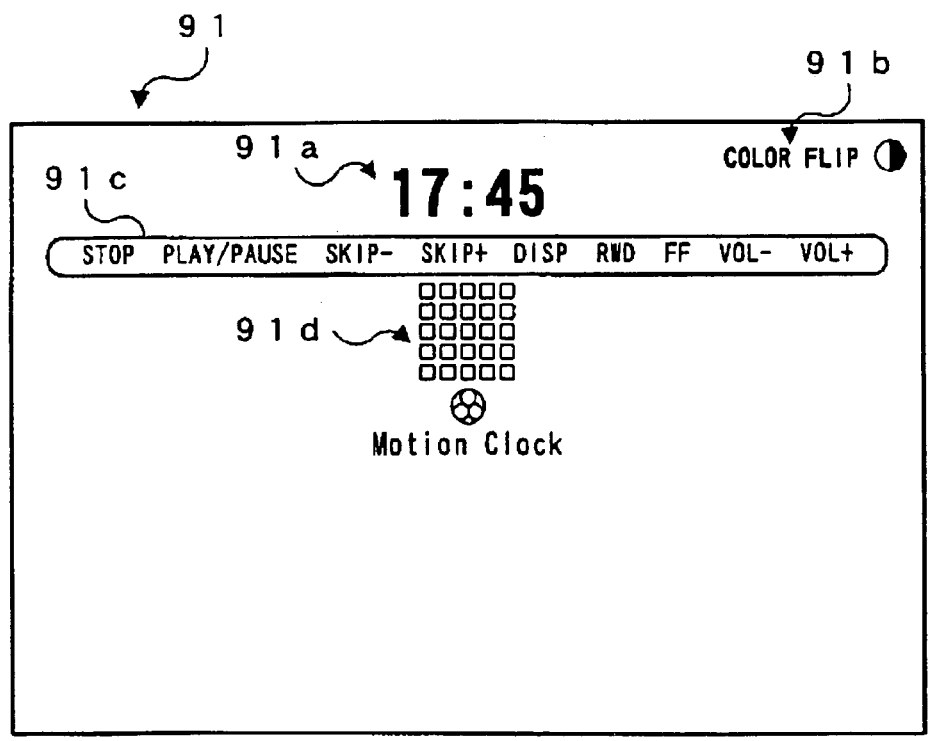

FIGS. 11A and 11B are illustrations showing layouts of the display for time and audio control 90 and 91. The size of the display for time and audio control 90 shown in FIG. 11A corresponds to that of the uncovered portion 15b of the liquid crystal display panel 15, which is 1024×384 dots. In contrast, the size of another display for time and audio control 91 shown in FIG. 11B corresponds to the sum of the sizes of the covered portion 15a and the uncovered portion 15b of the liquid crystal display panel 15, that is to say, the size of the whole liquid crystal display panel 15, which is 1024×768 dots.

In both of these layouts, time display objects 90a and 91a, other operational objects, such as operational objects for changing between monochrome/color display 90b and 91b and object groups for audio control 90c and 91c, and any accessory object such as suitably designed animation objects 90d and 91d are all included in the uncovered portion 15b. Both layouts can, therefore, be adopted without substantial problems. It is, however, desirable that the mode for the displays for time and audio control 90 and 91 be set to full screen display, similarly to the time displays 70 and 71, so that the title bar and a window frame are hidden and the desktop display is hidden in order to bring the displays for time and audio control 90 and 91 to the foreground. Hereinafter, descriptions will be made using the display for time and audio control 90 shown in FIG. 11A for the sake of simplicity.

According to the modified flowchart shown in FIG. 9, the launcher control unit 63b, which is in the resident state, evaluates the expression "device control( )=true" at predetermined time intervals, and determines whether the keyboard unit 13 is open or closed (step S21). If the evaluated result indicates that the keyboard unit is open, the launcher control unit 63b determines whether or not the time display 70 (the display specified for the closed state (1)) or the display for time and audio control 90 (the display specified for the closed state (2)) is open at that time (step S22). If the time display 70 (the display (1)) or the display for time and audio control 90 (the display (2)) is open, the launcher control unit 63b closes the opened display (step S23). If the time display 70 (the display (1)) or the display for time and audio control 90 (the display (2)) is not opened, the launcher control unit 63b determines whether or not the second application program 64 is active (step S24).

Here, active means the state in which the second application program 64 is being executed as a task.

If the determination result in step S24 is "yes", that is to say, if the second application program 64 is active, the launcher control unit 63b focuses on the running display (the detailed display 80 or the simple display 81) (step S25). Then, the launcher control unit 63b returns to the step for determining whether the keyboard unit 13 is open or closed (step S21).

In the routines from step S21 to S25, if the time display 70 or the display for time and audio control 90 is open when the keyboard unit 13 enters the open state, the display can be closed. Also, if the second application program 64 is active at that time, the running display (the detailed display 80 or the simple display 81) can be selected ("in focus" state).

In contrast, if the launcher control unit 63b determines that the keyboard unit 13 is closed in the step for determining whether the keyboard unit 13 is open or closed (step S21), the launcher control unit 63b determines whether or not the second application program 64 is active (step S26). Then, the launcher control unit 63b selectively executes one of the two routines described below, in response to the determination result.

Routine 1: Keyboard Unit 13: Closed, Second Application Program 64: Inactive In Routine 1, the launcher control unit 63b determines whether or not the time display 70 (the display (1)) is open (step S27). If the time display 70 (the display (1)) is open, the launcher control unit 63b returns to the step for determining whether the keyboard unit 13 is open or closed (step S21). If the time display screen 70 (the display (1)) is not opened, the launcher control unit 63b opens the time display 70 (the display (1)) (step S28), and then the launcher control unit 63b returns to the step for determining whether the keyboard unit 13 is open or closed (step S21). In this routine, the display specified for showing time information in the closed state (in other words, the time display 70) can be displayed, as in the embodiment described above.

Routine 2: Keyboard Unit 13: Closed, Second Application Program 64: Active

In Routine 2, the launcher control unit 63b determines whether or not the display for time and audio control 90 (the display (2)) is open (step S29). If the display for time and audio control 90 (the display (2)) is open, the launcher control unit 63b returns to the step for determining whether the keyboard unit 13 is open or closed (step S21). If the display for time and audio control 90 (the display (2)) is not opened, the launcher control unit 63b opens the display for time and audio control 90 (the display (2)) (step S30), and then returns to the step for determining whether the keyboard unit 13 is open or closed (step S21). In this routine, a display specified for the closed state that is different from that in the embodiment described above, that is to say, the display specified for the closed state (the display for time and audio control 90) including the operational objects (for example, title objects, such as "STOP", "PLAY/PAUSE", "SKIP −", "SKIP +", "DISP", "RWD", "FF", "VOL −", "VOL +"), which are in accordance with the second application program 64, can be displayed. Functions associated with a click event for each title object are as follows:

"STOP": stop playback,
"PLAY/PAUSE": start play/interrupt play during playback,
"SKIP −": go to the beginning of the current track,
"SKIP +": go to the beginning of the next track,
"DISP": switch the display form of track playing time,
"RWD": rewind the current track,
"FF": fast forward the current track,
"VOL −": lower the volume,
"VOL +": turn up the volume.

Consequently, according to the modified flowchart, the display specified for the closed state (the time display 70 or 71) for displaying time information can be displayed on the uncovered portion 15b of the liquid crystal display panel 15 while the keyboard unit 13 is closed, as in the embodiment described above. Also, another type of display specified for the closed state (display for time and audio control 90 or 91), which includes an interface similar to the second application program 64, instead of the display specified for the closed state (the time display 70 or 71) for displaying time information, can be displayed while the second application program 64 is active.

Consequently, by using the latter display specified for the closed state (the display for time and audio control 90 or 91), a particular advantage such as the ability to manipulate various audio resources without problems can be obtained even if the keyboard unit 13 is collapsed. Therefore, advantageous technology can be offered by applying this advantage to electronic apparatuses having a function for playing back, for example, TVs and DVDs.

The modifications described below may be made although they are not mentioned in the above descriptions.

First Modification

When the time display 70 or 71 shown in FIGS. 6A or 6B is open, if the user clicks a particular character string on the display, the display for time and audio control 90 or 91 shown in FIGS. 11A or 11B may be displayed, instead of the time display 70 or 71. In this case, if the second application program 64 is not being executed, the second application program 64 is executed at the same time. On the other hand, when the display for time and audio control 90 or 91 shown in FIGS. 11A or 11B is open, if the user clicks a particular character string (for example, Motion Clock) on the display, the time display 70 or 71 shown in FIGS. 6A or 6B may be displayed, instead of the display for time and audio control 90 or 91.

Second Modification

When the time display 70 or 71 shown in FIGS. 6A or 6B is open or when the display for time and audio control 90 or 91 shown in FIGS. 11A or 11B is open, the lower half (covered portion 15a) of the liquid crystal display panel 15 is covered. If a cursor is located in the covered portion 15a, it is troublesome for the user to move the cursor to the uncovered portion 15b in order to select an object. In order to overcome this problem, the coordinates of the cursor are limited to the uncovered portion 15b while the keyboard unit 13 is closed (while the detection signal Sa is active). The cursor is not covered, so that the inconvenience of the user having to move the cursor to the uncovered portion 15b can be avoided.

Third Modification

For example, when animation objects such as Flash (registered trademark) animations are included in the time display 70 or 71 shown in FIGS. 6A or 6B or the display for time and audio control 90 or 91 show in FIGS. 11A or 11B in order to enhance the visual effect, some hardware resources (for example, the capacity of the CPU 31) are required for display control of such animation objects. If a high-load application program (for example, an image processing program such as an MPEG decoder) is being executed in the background, there is a possibility that the running program may adversely affect the operation of the image processing program. For example, frames may be dropped. In order to overcome this problem, for example, if the particular high-load application program is being executed, the display of the animation objects mentioned above may be prevented, or a corresponding message may be displayed instead of the display including these animation objects (the time display 70 or 71, or the display for time and audio control 90 or 91).

Furthermore, in order to improve audio quality, it is desirable that the speakers 16R and 16L provided on both sides of the liquid crystal display panel 15 not be covered by the keyboard unit 13 even if the keyboard unit 13 is closed. For example, the speakers 16R and 16L are disposed on a portion of the display unit 11 in such a manner that the speakers 16R and 16L are located above the portion covered by the keyboard unit 13, as shown in FIG. 1C. This arrangement provides optimal sound quality even when the user listens to a musical composition or the like with the keyboard unit 13 closed, thus improving the audio quality.

Main functions of the electronic apparatus according to this embodiment are functionally realized by a combination of hardware resources including the microcomputer (CPU 31) and software resources, such as a basic program and various application programs. Since the general hardware resources and basic program can be used, essential items of the present invention are substantially incorporated into the first application program 63. Consequently, the present invention includes recording media, such as a floppy (registered trademark) disk, a magneto-optical disk (MO), a compact disk (CD), a hard disk, or a semiconductor memory, which stores the entire first application program 63 or most of it. The recording media include a recording medium that is on the network and that provides only recorded content, as well as a recording medium physically distributed.

The electronic apparatus according to the present invention includes detecting means for detecting whether a portion of a display area of a display unit is covered by an input device and display control means for controlling a display mode for an uncovered portion, which is not covered by the input device, of the display area of the display unit while the detecting means detects that a portion of the display area of the display unit is covered by the input device. Therefore, a portion of the display screen of the display unit (uncovered portion) can be used even while the input device is collapsed. Accordingly, both the ability to store the input device and availability of the display unit can be simultaneously achieved.

Also, according to an embodiment of the present invention, the input device may be a keyboard unit. In the display mode, any display may appear on the uncovered portion, which is not covered by the keyboard unit. Therefore, by using the display, a portion of the display screen of the display unit (uncovered portion) can be used while the keyboard unit is not used.

According to another embodiment of the present invention, the display may include either the current date or the current time, or both the current date and the current time. Accordingly, a portion of the display screen of the display unit (uncovered portion) can be used for either date display or time display, or both the date and time display while the keyboard unit is not used.

According to still another embodiment of the present invention, while a predetermined application program is being executed in the electronic apparatus, the display may have a format corresponding to the application program. Therefore, for example, if an application program for playing back content, such as animation or music, is used, the user can grasp the operating state of the application software for playing back content and can operate the application software through the display appearing on the uncovered portion of the display unit.

According to still another embodiment of the present invention, in the display control step, a cursor is located on the uncovered portion, which is not covered by the keyboard unit, while the processing in the detecting step detects that a portion of the display area of the display unit is covered by the keyboard unit. Therefore, while the keyboard unit is closed, the cursor is always located on the uncovered portion of the display unit. Consequently, the cursor is not hidden in the covered portion.

What is claimed is:

1. An electronic apparatus comprising:
    an input device;
    a display unit including a first portion and a second portion;
    a fixing unit configured to position the input device relative to the first portion, the input device being inaccessible to a user and blocking the first portion of the display unit in a closed position;
    a detecting unit configured to detect whether the input device is in the closed position; and
    display control means for controlling a display interface confined to the second portion, which is not blocked by the input device while the input device is in the closed position,
    wherein a cursor is confined to the coordinates of the second portion while the input device is in the closed position.

2. An electronic apparatus according to claim 1, wherein the input device comprises a keyboard unit.

3. A method for controlling an electronic apparatus including a display unit and an input device, the display unit including a first portion and a second portion, comprising:
    detecting whether the input device is in a closed position, the input device being inaccessible to a user and blocking the first portion of the display unit in the closed position; and
    controlling a display interface confined to the second portion, which is not blocked by the input device while the input device is in the closed position,
    wherein a cursor is confined to the coordinates of the second portion while the input device is in the closed position.

4. A method for controlling an electronic apparatus according to claim 3,
    wherein the input device comprises a keyboard unit, and
    wherein, in the display control step, a cursor is located on the second portion while the detecting step detects that a portion of the display area of the display unit is covered by the keyboard unit.

5. A computer program product for executing a predetermined processing function to control an electronic apparatus including a display unit and an input device, the display unit including a first portion and a second portion, the processing function comprising:
    detecting whether the input device is in a closed position, the input device being inaccessible to a user and blocking the first portion of the display unit in the closed position; and
    controlling a display interface confined to the second portion, which is not blocked by the input device while the input device is in the closed position,
    wherein a cursor is confined to the coordinates of the second portion while the input device is in the closed position.

6. A computer program product according to claim 5,
    wherein the input device comprises a keyboard unit, and
    wherein, in the display control step, a cursor is located on the second portion while the detecting step detects that the first portion is covered by the keyboard unit.

* * * * *